(12) United States Patent
Janssen et al.

(10) Patent No.: US 7,069,559 B2
(45) Date of Patent: Jun. 27, 2006

(54) SYSTEM AND METHOD FOR MONITORING SOFTWARE QUEUING APPLICATIONS

(75) Inventors: Rob Janssen, Madrid (ES); Angel L. Montero Sanchez, Madrid (ES)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 09/942,135

(22) Filed: Aug. 29, 2001

(65) Prior Publication Data

US 2003/0050956 A1    Mar. 13, 2003

(51) Int. Cl.
*G06F 3/00* (2006.01)
*G06F 9/46* (2006.01)

(52) U.S. Cl. ...................................... 719/314; 718/100
(58) Field of Classification Search ........ 718/100–108; 709/200–253; 719/314
See application file for complete search history.

(56) References Cited

U.S. PATENT DOCUMENTS

| | | | |
|---|---|---|---|
| 5,675,798 A | 10/1997 | Chang | 395/680 |
| 6,085,277 A * | 7/2000 | Nordstrom et al. | 710/263 |
| 6,216,173 B1 * | 4/2001 | Jones et al. | 345/705 |
| 6,246,691 B1 * | 6/2001 | Briem et al. | 370/412 |
| 6,757,289 B1 * | 6/2004 | Cain et al. | 370/401 |
| 2002/0035620 A1 * | 3/2002 | Takashashi et al. | 709/220 |
| 2003/0016685 A1 * | 1/2003 | Berggreen | 370/412 |
| 2003/0225923 A1 * | 12/2003 | Cyr et al. | 709/313 |

OTHER PUBLICATIONS

"Patrol for Microsoft Windows 2000" BMC Software, Jan. 2001, XP002257426.
Horrell S.: Microsoft Message Queue (MSMQ) Enterprise Middleware, Xephon, Newbury, US, Jun. 1999, pp. 20-31.
"Monitoring Message Queuing," Microsoft Windows 2000 Server, Online Aug. 18, 2001, Retrieved from Internet: www.microsoft.com/windows200/en/server/help/sag_MSQconcepts4_4.htm on Apr. 13, 2004.
Copy of International Search Report for PCT/EP02/09680.
Copy of International Preliminary Examination Report for PCTEP02/09680.

* cited by examiner

*Primary Examiner*—Meng Ai T. An
*Assistant Examiner*—Kenneth Tang
(74) *Attorney, Agent, or Firm*—John R. Pivnichny; Myers Bigel Sibley & Sajovec (57) ABSTRACT

A computer implemented method for monitoring up-stream and down-stream software applications in a message queuing transmission system. The transmission system comprises at least one processing task that is able to read a plurality of incoming messages from at least one input queue and to write a plurality of outgoing messages into at least one output queue. The method allows for determining the number of messages in each of the input queues and the number of messages in each of the output queues, for determining the activation status of the processing task, and for gathering the results to display on a task monitor screen. The depth and status information are regularly refreshed.

17 Claims, 5 Drawing Sheets

SYSTEM AND METHOD FOR MONITORING SOFTWARE QUEUING APPLICATIONS

FIELD OF THE INVENTION

The present invention generally relates to data transmission in computer networks, and more specifically to a method and system for monitoring software queuing applications.

BACKGROUND

With the advent of network communication standards such as FDDI, BISDN, and SONET, the day of gigabit computer communications is here, and the day of terabit communications is fast approaching. These high speed network environments demand new and powerful tools, which depend upon information from the network to assist in the network design, network management, network control functions, and network services. A crucial problem with these high speed environments is to monitor the raw data from one or more high speed communications channels and convert this data to useful "information" for a user, for a service, as an input to an algorithm whenever it is required, and so on.

Up to now, this problem has been viewed as "real-time" network monitoring and performance evaluation. Network monitoring is generally defined as extracting, processing, collecting, and presenting dynamic information with respect to the operation of a system. Monitoring information is then used by network performance management analysts to evaluate the state of network resources in real-time, usually by an individual analyzing the monitoring information on a computer display.

One of the requirements of managing large networking structures is to monitor a great number of various applications that are responsible for information transmission throughout a computer network that may include disparate platforms.

Some of these of applications are background tasks, which are commonly named as such because they generally do not offer a user interface. There is a need for behavioral information about background tasks that are responsible for information transmission among a variety of systems. In fact, an application operator needs to know whether a transmission is successful or not, and whether the transmission encountered problems or bottlenecks. Unfortunately, the background tasks do not provide any status information, and thus the application operator has no way to determine whether the application is working correctly or not.

A widely used approach to heterogeneous application transmission is message queuing. Message queuing enables distributed applications to exchange messages regardless of the hardware and software resources. In message queuing systems, the sending applications need not be concerned about the delivery routes or the timing of when the receiving applications pickup the messages. The receiving application can pick up new messages when appropriate, without necessarily maintaining a direct link with the sending application. The receiving application can also confirm receipt if required.

Messages may flow between applications synchronously or asynchronously. Synchronous mode allows the sending application to receive a reply from the receiving application before continuing. Messages can also flow between applications in a one-to-one mode, one-to-many, many-to-one, or any combination.

Generally, a message application contains two parts: the application data, and the message identification data. The message may be identified by several parameters such as the type of message, the length of the application data, and the priority level of the message.

Several ways are known to monitor message applications and their resources. Commercial products like Tivoli from Tivoli System and Omegamon from IBM Corporation allow monitoring of queues and determination of the status of the applications. With these products, the application operator must continuously navigate through a plurality of panels to find the parameters needed to take appropriate actions. While doing so, there is a risk of missing an important problem that occurs in the applications.

Other commercial products, such as the MQSeries and the CICS from IBM Corporation, provide ways to determine the depths of queues and the status of applications.

U.S. Pat. No. 5,655,081 issued to Bonnell et al. discloses a system for monitoring and managing computer resources and applications across a distributed computing environment using an intelligent autonomous agent architecture. Like the aforementioned products, this system is able to trigger an alert message when a queue contains a predetermined number of messages with no application identification.

None of today's tools, however, provides the operator with a unique interface that gathers status of the tasks and the depth of queues relevant to a specific application to be monitored. Instead, the known systems provide information on all applications in the entire system.

Therefore, there is a need to provide the application operator with a single system that gathers all the information relevant to one application and the resources being used.

SUMMARY OF THE INVENTION

An object of the invention is to provide an application monitoring system that gathers automatically, in a unique view, information useful for error detection.

Another object of the invention is to provide such a system which operates without user interaction.

The present invention achieves the foregoing and other objects by providing a computer implemented method for monitoring up-stream and down-stream software applications in a message queuing transmission system. The transmission system comprises at least one processing task that is able to read a plurality of incoming messages from at least one input queue, and to write a plurality of outgoing messages into at least one output queue. The method comprises the steps of:

a. assigning input and output queue group identifiers to the input queues and the output queues, respectively;
b. for each queue group, assigning queue identifiers to each of the input queues and to each of the output queues;
c. assigning task identifiers to the processing tasks;
d. initializing a refresh counter having a predetermined refresh interval time;
e. for each queue group, determining the number of messages stored in each of the input queues and the number of messages stored in each of the output queues;
f. determining the activation status of the identified processing task;
g. gathering the results of the determining steps in a task monitor storage area; and
h. repeating steps (e) to (g) for each time interval.

In a preferred embodiment, the gathered results are displayed on a display screen controlled by an operator.

In another embodiment, the up-stream applications deliver the incoming messages and the down-stream applications receive the outgoing messages. The transmission system further comprises at least one reply queue for receiving at least one reply message from the down-stream applications in response to at least one outgoing message, and further comprises at least one reply task for processing reply messages.

In another embodiment, the method further includes the steps of computing the time interval between the time an outgoing message is written into an output queue and the time the respective reply message is written into the reply message queue. According the value of the time interval, a warning message may be displayed to the operator.

DETAILED DESCRIPTION OF THE INVENTION

Figure 1:
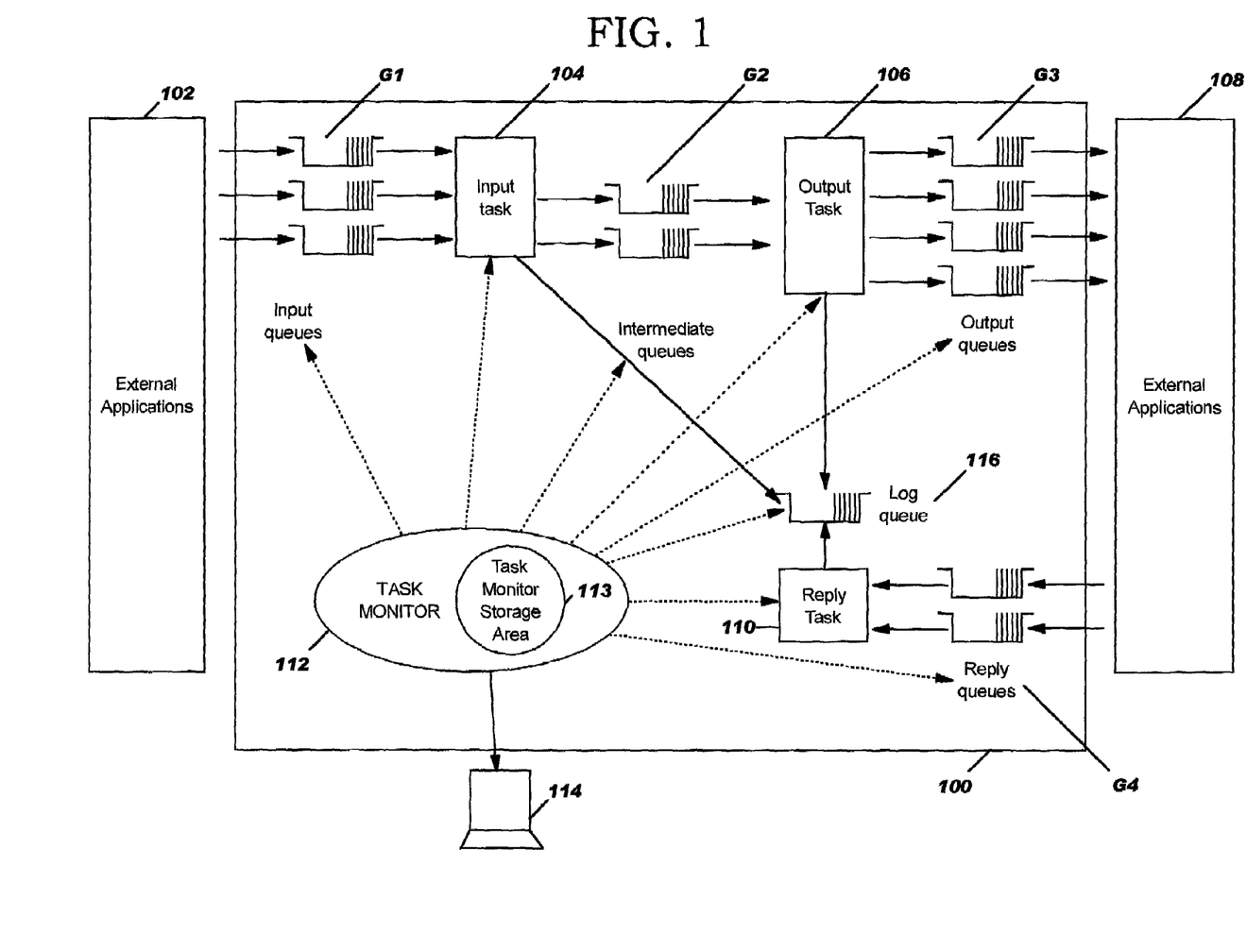
FIG. 1 is a simplified diagram of a message queuing transmission system in which the method of the present invention is practised.

With reference first to FIG. 1, a simplified message queuing transmission system 100, in which the method of the present invention may be practiced, is now described. Generally, incoming information related to a background task is delivered by up-stream external software applications 102 and is processed within the transmission system 100 through several layers of queues before being output to down-stream external software applications 108.

The present invention may be operated in any networked computing environment, regardless of hardware, operating systems or connectivity; consequently, no reference is made to those aspects.

Specifically, the incoming information arrives from up-stream applications 102, which put a plurality of messages into input queues 'G1'. The messages are next captured by input tasks 104, and provided to intermediate queues 'G2', after some application logic process. The intermediate messages queues 'G2' are next processed by output tasks 106, which then deliver outgoing messages to output queues 'G3'. The output information is then taken by the down-stream applications 108.

The down-stream applications 108 may acknowledge the reception of the outgoing messages and feed back reply messages to the transmission system, leaving the reply messages in reply queues 'G4', which are then processed by one or more reply tasks 110.

The tasks of the transmission system may send error information to an error-log queue 116.

Each of the queues and each of the tasks is monitored by a task monitor 112, which is able to provide at any time a unique overview of the status of the information transmission system, as will be described in detail below with reference to FIGS. 2 to 5. The task monitor 112 collects status data along the transmission system that are required by an application operator to determine the efficiency of the system, and writes these data into a task monitor storage area 113. In a preferred embodiment, the data collected are the depths of the queues, the activation/deactivation status of the tasks, time-stamp differences between the output queues and the reply queues, and the contents of the error-log queue.

The collected status of the transmission system is then read from the task monitor storage area 113, and displayed on a monitor screen 114.

Those skilled in the art will understand that the invention may be applied to various configurations of message queuing transmission systems. It is also to be understood that the wording 'tasks' or 'applications' or 'resident transactions' may be used to designate the internal processes (104,106, 110) of the transmission system. Furthermore, the queues to store the messages may be in the form of standard message queuing products, such as the already mentioned MQSeries from IBM Corporation.

Figure 2:
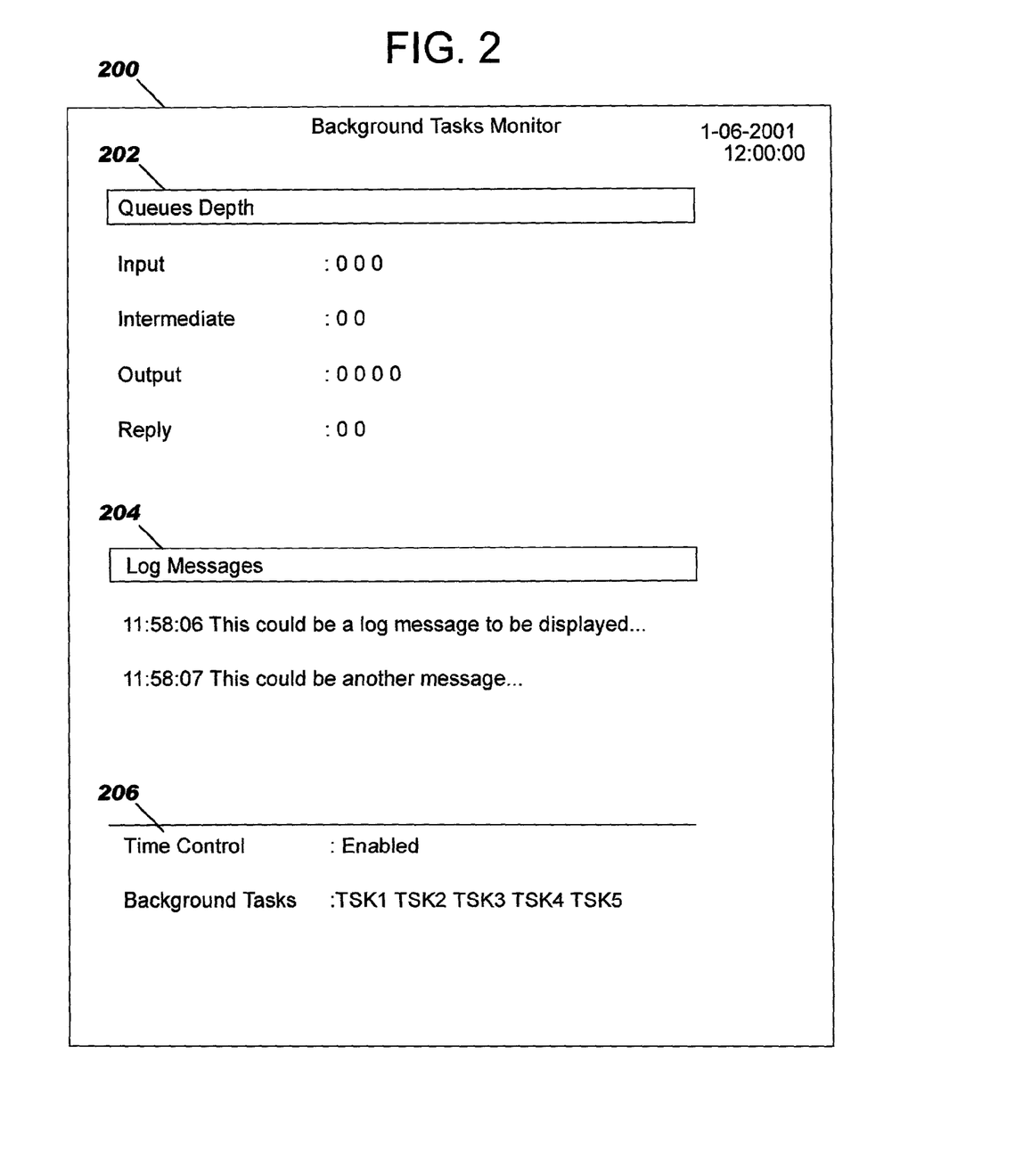
FIG. 2 shows a Task Monitor screen of the present invention displaying message queuing information for the system of FIG. 1.

FIG. 2 shows a presentation 200 on the monitor screen 114 by the task monitor 112. This presentation is refreshed according to an interval specified by the operator, as described below with reference to FIG. 5. The task monitor 112 displays the status of the message queuing transmission system of FIG. 1, when controlling several groups of tasks (TSK1 to TSK5). The presentation 200 includes several information areas (202 to 206). A first information area 202 provides information on the "Queues Depth" status. A second information area 204 provides information on the "Log Messages" status, and a last area 206 provides information on the "Time control" parameter status and on the active/inactive status of the "Background Tasks".

The "Queues Depth" area 202 displays the number of messages present at a given instant in each of the queues of the transmission system of FIG. 1.

The "Queues Depth" area has as many rows as there are Queues Groups, as will be further detailed with reference to FIG. 3. Each row has as many columns as there are queues in the respective Queue Group.

A queue depth value of zero indicates that there is no backlog in the associated application, and that the application is likely to have worked properly. A queue depth value other than zero indicates that there is backlog, and thus indicates to the operator that action might be required, especially if the backlog does not disappear after a refresh of the presentation 200. If for any reason the depth of a queue cannot be determined, a special warning is displayed on the task monitor screen 114.

The warning may include displaying the corresponding row in a specific color, and posting a warning message to the "Log Messages" area 204. The "Log Messages" area 204 contains the successive error messages sent by the tasks to the Log queue 116.

A further information area 206, named "Background Tasks" on FIG. 2, contains a list of the different background tasks that are watched. The Background Task area may further contain an indication of the status (which can be "enabled" or "disabled") of a Time Control feature. The Time Control feature is described below with reference to FIG. 4; it should be noted now that the task monitor 112 may operate with or without the Time Control Feature. Furthermore, the exemplary organization of the screen presentation 200 described here is not intended to limit the invention; rather, other presentations of the relevant parameters may be easily devised by those skilled in the art once taught the present invention.

Figure 3:
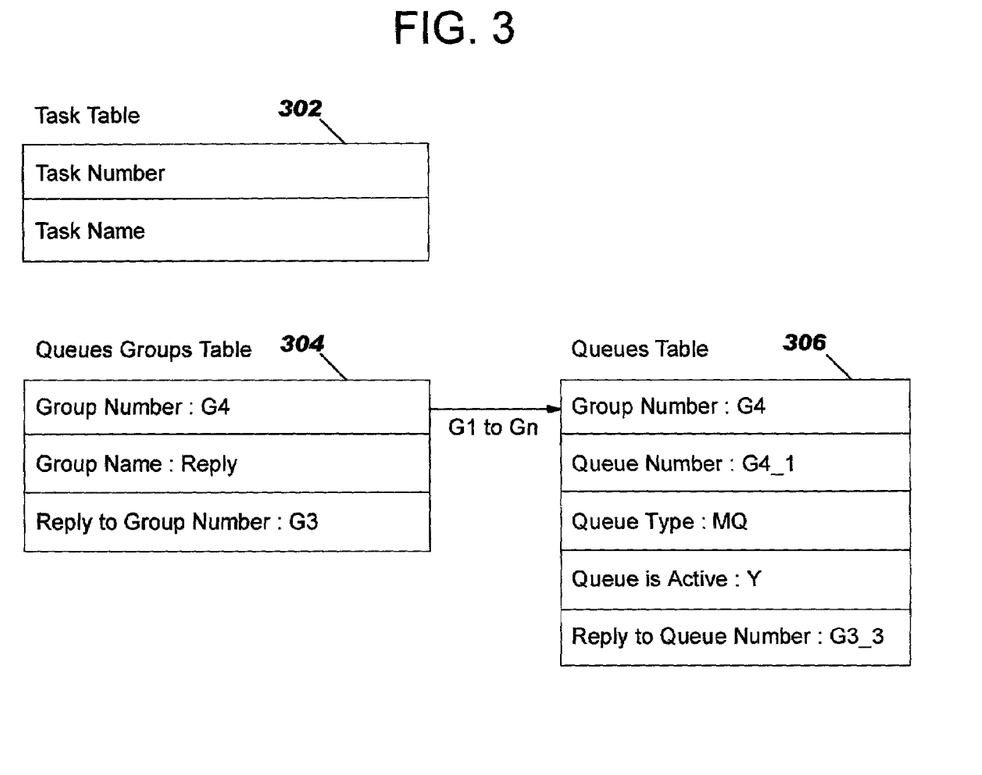
FIG. 3 illustrates table structures for handling the queues and task configurations of the present invention.

Referring now to FIG. 3, a preferred implementation for supporting the queue configurations for operating the Task Monitor 112 is shown in the form of a Tasks table 302 and Queues tables 304,306. The tables contain identifiers to identify the queues and the tasks in the following manner. The content of the tables is read when the Task Monitor 112 is started, as will be further described.

Background Tasks are classified into the Tasks table 302, according to a first identifier for indicating a Task Name for each background task and a second identifier for indicating a Task Number for each task whose activity is intended to be monitored.

The Queues are grouped into Queues Groups which are referenced in the Queues Groups table 304. The Queues Groups table 304 contains a first identifier for indicating a Group Name, and a second identifier for indicating a Group Number (G1 to Gn). Grouping of the queues may depend on the particular configuration of the message queuing transmission system. In the example of FIG. 1, the queues are grouped in four groups: the Input Group 'G1', the Intermediate Group 'G2', the Output Group 'G3' and the Reply Group 'G4'. The Group table associated with the Reply Group contains a further identifier to indicate the Group Number with which the Reply Group is associated. In the present example, the Reply Group 'G4' is associated with the Output Group 'G3'.

Each Queues Group is linked to a Queues table 306 which details the plurality of queues belonging to the respective Queues Group. Each Queues table contains a first identifier to indicate the Queues Group Number with which it is associated, a second identifier to indicate the Queues Numbers of the respective Queues Group Number, and a third identifier to define the Queue Type. A further identifier may be added to indicate whether the queue is active or not.

For the Reply Group, a further identifier indicates the Queue Number with which the Reply Queue Number is associated. In the present example, the Queue Number 'G4-1' is associated with the Output Queue 'G3-3'. It is to be understood that the examples are presented only for clarity of description, and are not intended to limit the invention. One skilled in the art could devise other configurations of data tables, once taught the present invention.

As described further below, a correspondence between a Reply Queues Group and an Output Queues Group enables the construction of a plurality of queue pairs of the form (Output Queue, Reply Queue) to be used by the Time Control feature.

The Time Control feature computes the time interval between the time when message is written to the output queue and the time when a reply is written to the reply queue. Thus, for a Reply Group that replies to an Output Group, each of the Reply Queues may be defined as being linked to one of the Output queues belonging to the Output Group.

The Queue Type information refers to the way in which the programs access the queues for the referenced application, for example, to the use of CICS commands to access CICS queues, or to the use of MQ statements to access queues of the type MQ Series.

Figure 4:
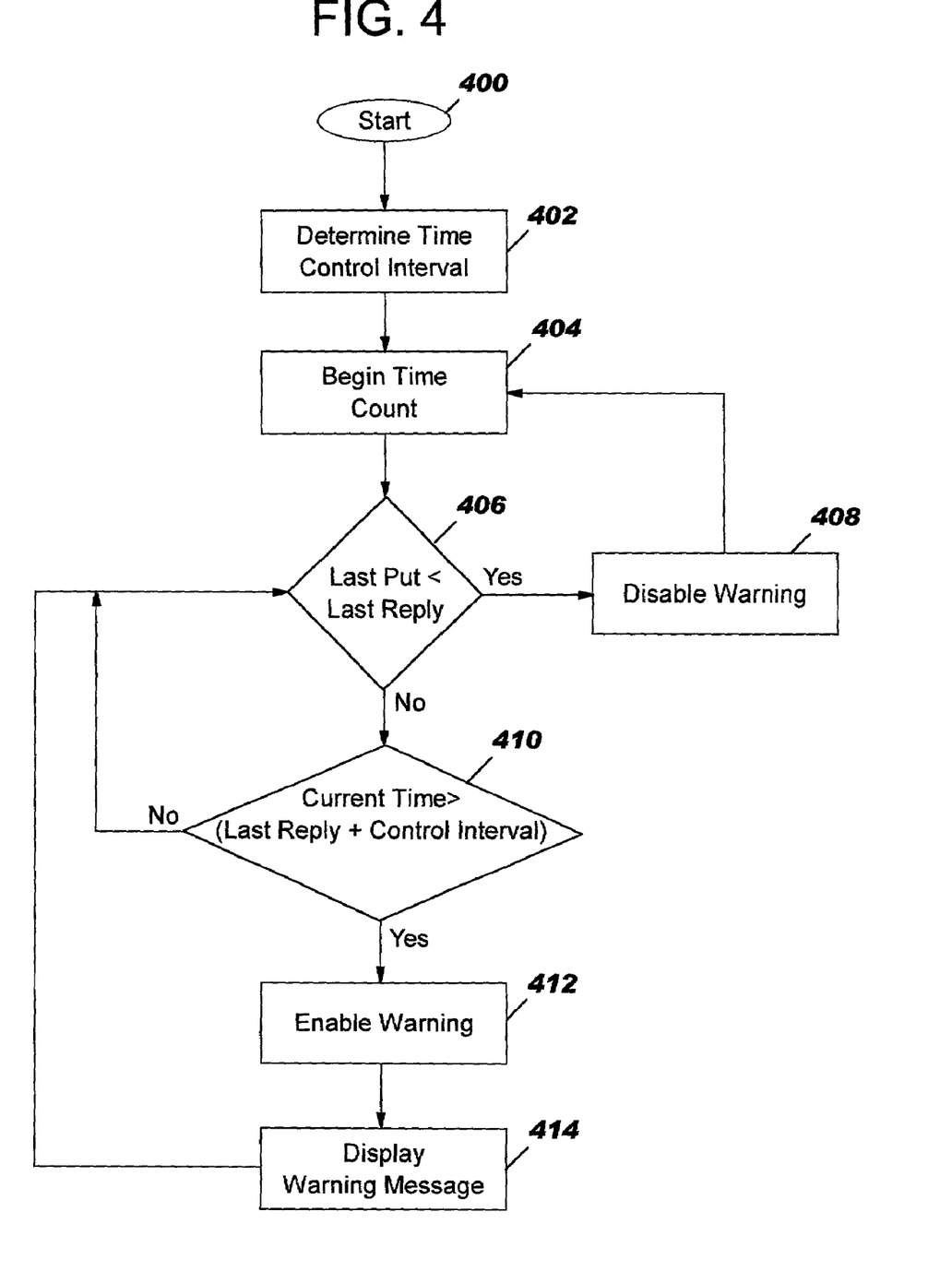
FIG. 4 is a flowchart showing the time control operation of the present invention.

FIG. 4 is a flowchart that illustrates the operation of the Time Control feature of the present invention in an exemplary embodiment. Nevertheless, the Time Control feature is optional, and the invention may be practiced without this feature. The Task Monitor 112 may be started with the Time Control feature enabled or disabled. The objective of the Time Control feature is to monitor the functioning of the down-stream applications (108). The down-stream applications read from the output queues (G3) and write "acknowledge reception" reply messages in the associated Reply Queues (G4). The Time Control feature enables the determination of the elapsed time between writing a message to the output queue (G3) and writing the corresponding reply message to the reply queue (G4). This provides information to the application operator about whether the down-stream applications (108) are working properly or not.

The Time Control feature may be activated for each pair of (Output Queue, Reply Queue).

The process starts in step 400 when the Time Control feature is enabled. A Time Control interval is determined (step 402). The Time Control interval is specified by the operator as described below with reference to FIG. 5. Preferably, the operator fixes the same value for each queue pair. The Time Control Interval specifies the time that is acceptable for a message to be on the output queue (G3) before it is retrieved by the down-stream application (108).

Next, a time control counter begins to count for the first time control interval (step 404).

For each queue pair, the time at which the last message was put on one of the output queues (G3) by the output task (106) (herein called the last put) is compared with the time at which the last reply message was received by the reply task (110) (step 406).

If the last put is earlier than the last reply (branch Yes), this may indicate that the down-stream application is promptly processing messages. If a warning message was enabled in a previous status verification (in step 412), the warning is disabled (step 408), since the down-stream application may have caught up with reading the messages, and the time control counter begins again (step 404).

If the last put is later than the last reply (branch No), this may indicate that the down-stream application (108) is not promptly processing the messages on the output queue (G3). A determination is made as to whether this time of inactivity is within the time specified by the Time Control Interval or not (step 410).

If this time is within the time specified by the Time Control interval (branch No), it is too early to issue a warning, and the process loops back (to step 406).

If this time is more than the time specified by the Time Control interval (branch Yes), a warning message is enabled (step 412) and displayed for the current queue pair (step 414). As previously explained, the warning message is sent to the Log Messages area 204, and the corresponding rows in the queues depth may be highlighted.

Figure 5:
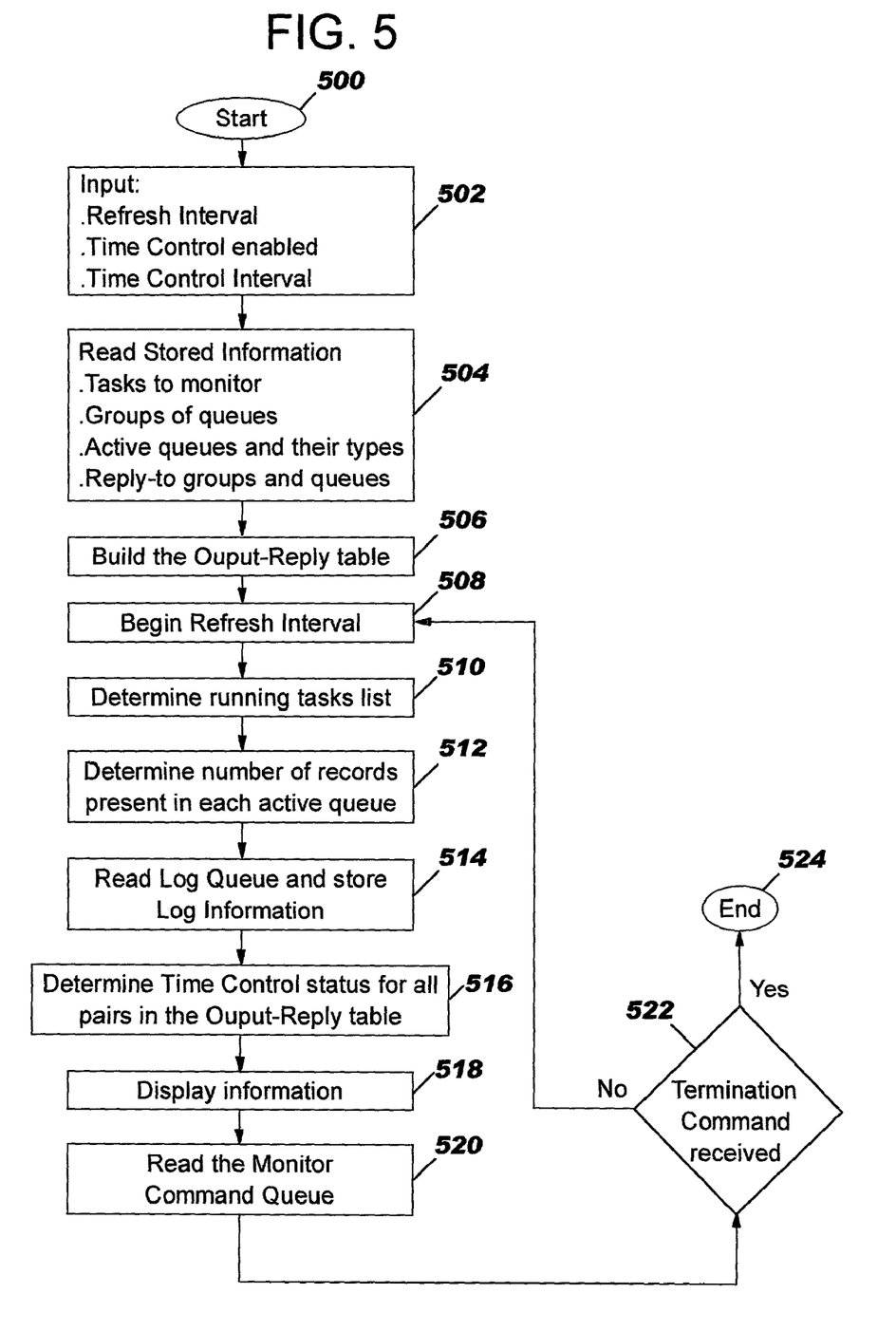
FIG. 5 is a flowchart showing the operation of the Task Monitor system of the present invention.

FIG. 5 is a flowchart showing the operation of the Task Monitor system of the present invention.

The process begins (step 500) when the Task Monitor 112 is started. On the monitor screen, the operator is presented with an input form to be completed. The form may request:
a Refresh interval value;
a Time Control status (enabled/disabled); and
a Time Control interval value for each queues pair.

The Refresh interval controls the timing of refreshing the status of the relevant data collected. The information area is refreshed at regular intervals specified by the refresh interval value, and updated data are displayed. In the preferred implementation, the Refresh interval is set to several seconds.

The Tables are read by the Task Monitor 112 (step 504) to determine the configuration to be monitored. The relevant data are thus collected by fetching the information (according to the respective access method) stored in the Queues Tables 304,306 and in the Tasks Table 302. The Tables may be stored either in a relational database system or as flat files, without having any influence on the general method of the invention. Particularly, in Task table 302, the task monitor 112 points to the value of the Tasks Numbers and of the Task Names whose activities are to be controlled. In tables 304 and 306, the task monitor 112 points to the values of Group Numbers for which the queue depths of the queues belonging to the respective Group are to be displayed every time the refresh interval finishes. Furthermore, the task monitor 112 points to the value Queue Numbers of the Reply queues.

Next, (step 506), the queue pairs (Output Queue, Reply Queue) are created. The queue pairs are arranged in the form of an Output-Reply array comprising for each queue pair the information illustrated by the table below:

| Output Queue Number | Reply Queue Number | Last Put Time stamp | Last Reply Time stamp |
| --- | --- | --- | --- |

The Output-Reply array may be stored in a memory area in a way that makes it accessible to both the tasks that put the messages in the Output Queues, and to the tasks that get the messages from the Reply queues.

The tasks that put messages in the Output Queues write the time stamp (the moment the put is done) in the "Last Put" field, and the tasks that get the messages from the Reply queues write the time stamp (the moment the get is done) in the "Last Reply" field.

In an embodiment where the Reply Queues are not implemented, the process goes directly from step 504 to step 508, of FIG. 5.

After the Output-Reply array is built, the refresh counter begins for the Refresh interval (step 508). During each refresh interval, a sequence loop of operations is executed:

in step 510, a list of the active background tasks is determined by inquiring of the task monitor 112 the status of the tasks. The result is compared with the list of tasks to be monitored. If a task is not running, the operator is warned (step 518). The corresponding Task Name in the task information area 206 may be highlighted and a warning message may be displayed on the next log line of the Log Messages area 204.

in step 512, the number of records present in each active queue is determined; if a number of records cannot be determined, a Log message is generated in the Log Messages area 204, and the corresponding value of the respective queue row is highlighted in the Queue Depth area 202 (step 518).

in step 514, the Log queue is read, and the information is stored in a storage means dependent upon the implementation, such as a SQL table, a file, or any other persistent repository that allows data review. If a problem is encountered while reading the Log queue, an error message is issued in the Log Messages area 204. Preferably, the information is displayed in the upper region of the Log Message area (204), and the old content area is automatically scrolled down so that the operator always sees the last log messages (step 518).

in step 516, the Time Control process is operated for each queue pair (Output Queue, Reply Queue) as previously described with reference to FIG. 4, provided that the Time Control Feature was enabled in step 502. If the Time Control Feature is not enabled, the process goes directly from step 514 to step 518.

in step 518, the data collected in steps 510,512,514 and 516, are gathered, written into the task monitor storage area 113, and displayed on the Monitor screen;

in step 520, the operator is provided with an option to enter a termination message; if a termination command is received by the task monitor 112 in step 522, the process is ended (step 524); otherwise, the process loops to step 508 until the operator enters a termination message.

While the invention has been shown and described with reference to a particular embodiment thereof, it will be understood by those skilled in the art that various changes in form and details may be made without departing from the spirit and scope of the invention.

We claim:

1. A computer implemented method for gathering status information in a message queuing transmission system, the method comprising:

forming a first queue group by assigning an input queue group identifier to a first input queue and to a second input queue within a message queuing transmission system;

forming a second queue group by assigning an output queue group identifier to a first output queue and to a second output queue within the message queuing transmission system;

assigning a first queue identifier to the first input queue, a second queue identifier to the second input queue, a third queue identifier to the first output queue, and a fourth queue identifier to the second output queue;

assigning a task identifier to a processing task within the message queuing transmission system that is able to read a plurality of messages from one of the queues in the first queue group and to write a plurality of messages to at least one of the queues in the second queue group;

determining a first number of messages stored in the first input queue, a second number of messages stored in the second input queue, a third number of messages stored in the first output queue, and a fourth number of messages stored in the second output queue;

determining if the processing task is actively running; and gathering, in a task monitor storage area, the first number of messages stored in the first input queue, the second number of messages stored in the second input queue, the third number of messages stored in the first output queue, the fourth number of messages stored in the second output queue, and the activation status of the processing task;

monitoring the status of at least one external application based on at least the first number of messages stored in the first input queue, the second number of messages stored in the second input queue, the third number of messages stored in the first output queue, the fourth number of messages stored in the second output queue and the determination if the processing task is actively running.

2. The method of claim 1, repeating the steps of determining and the step of gathering according to a refresh time interval of a refresh counter.

3. The method of claim 1, further including the step of presenting contents of the task monitor storage area on a display screen.

4. The method of claim 1, further including the step of writing an error message from the processing task to an error-log queue.

5. The method of claim 4, further including the step of presenting the error message on a display screen.

6. The method of claim 1, wherein the first queue identifier, the second queue identifier, the third queue identifier, and the fourth queue identifier are each different.

7. The method of claim 1, wherein the processing task is a background task.

8. The method of claim 1, further including the steps of:
storing the task identifier in a task identifier table;
storing the input queue group identifier and the output queue group identifier in a queues groups table; and
storing the first queue identifier, the second queue identifier, the third queue identifier, and the fourth queue identifier in a queues table.

9. The method of claim 1, further including the step of assigning a reply-to-group identifier to a reply queue for receiving a reply message generated in response to an outgoing message, wherein the reply message is generated by a down-stream software application for receiving the outgoing message.

10. The method of claim 9, wherein the reply message is taken from the reply queue and processed by a reply task.

11. The method of claim 9, further including the step of computing a time interval between writing the outgoing message to an output queue of the message queuing transmission system and writing the reply message to the reply queue.

12. The method of claim 11, further including the step of comparing said time interval with a predetermined time control interval.

13. A method of collecting data from a message queuing transmission system, the method comprising:
assigning a first plurality of queues that comprise part of the message queuing transmission system to a first queue group;
assigning a second plurality of queues that comprise part of the message queuing transmission system to a second queue group;
assigning a task identifier to a processing task within the message queuing transmission system that is able to read a plurality of messages from one of the queues in the first queue group and to write a plurality of messages to at least one of the queues in the second queue group; determining the number of messages stored in each queue in the first queue group;
determining the number of messages stored in each queue in the second queue group; determining if at least one of the application processing tasks that implements the message queuing transmission system is actively running; and
outputting the determined number of messages stored in each queue in the first queue group, the determined number of messages stored in each queue in the second queue group and the determined activation status of the at least one of the application processing tasks;
wherein the output determined number of messages stored in each queue in the first queue group, the determined number of messages stored in each queue in the second queue group and the determined activation status of the at least one of the application processing tasks is used to monitor the status of at least one external application.

14. The method of claim 13, further comprising repeating the steps of determining the number of messages stored in each queue in the first queue group, determining the number of messages stored in each queue in the second queue group, and determining the activation status of at least one of the application processing tasks that implements the message queuing transmission system according to a refresh time interval of a refresh counter.

15. The method of claim 13, the method further comprising outputting at least some of a plurality of error messages generated by the at least one of the application processing tasks.

16. The method of claim 13, wherein the at least one of the application processing task is a background task.

17. The method of claim 13, the method further comprising determining the time elapsed between the time a message is sent from one of the second plurality queues until a reply message is received by a queue that is part of a third queue group.

* * * * *